(12) United States Patent
Kundermann

(10) Patent No.: US 6,406,262 B1
(45) Date of Patent: Jun. 18, 2002

(54) VANE WHEEL FOR A HYDRODYNAMIC COUPLING DEVICE

(75) Inventor: Wolfgang Kundermann, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/618,122

(22) Filed: Jul. 17, 2000

(30) Foreign Application Priority Data

Jul. 17, 1999 (DE) .......................................... 199 33 655
Jun. 7, 2000 (DE) .......................................... 100 28 229

(51) Int. Cl.$^7$ .............................................. F04D 29/38
(52) U.S. Cl. ..................... 416/180; 416/213 R; 416/221
(58) Field of Search .............................. 416/180, 197 C, 416/220 R, 221, 213 R; 29/889.2, 889.21, 889.5, 524.1, 525.6

(56) References Cited

U.S. PATENT DOCUMENTS

| | | | | |
|---|---|---|---|---|
| 2,428,134 A | * | 9/1947 | Zeidler ........................ 415/141 |
| 2,503,025 A | * | 4/1950 | Bolender ................. 416/213 R |
| 2,660,957 A | * | 12/1953 | Koskinen ..................... 416/180 |
| 2,692,562 A | * | 10/1954 | Zeidler ........................ 416/180 |
| 3,550,234 A | | 4/1958 | Herold ........................ 29/156.8 |
| 3,986,239 A | * | 10/1976 | Worner ........................ 29/889.5 |
| 4,584,835 A | * | 4/1986 | Nishi ............................ 60/330 |
| 5,706,656 A | * | 1/1998 | Hinkel .......................... 60/345 |
| 5,893,704 A | * | 4/1999 | Prater ..................... 416/197 C |

* cited by examiner

*Primary Examiner*—Edward K. Look
*Assistant Examiner*—Ninh Nguyen
(74) *Attorney, Agent, or Firm*—Cohen, Pontani, Lieberman & Pavane

(57) ABSTRACT

A vane wheel, in particular an impeller wheel or turbine wheel, for a hydrodynamic coupling device includes a shell which is rotatable about an axis of rotation and a plurality of vanes arranged at the shell in circumferential succession. Each of the plural vanes has at least one connection projection inserted into a connection recess provided in the shell. Further, the vanes each have a fastening projection arranged so that the vanes are fixedly connected with the shell in the area of this fastening projections.

23 Claims, 6 Drawing Sheets

VANE WHEEL FOR A HYDRODYNAMIC COUPLING DEVICE

BACKGROUND OF THE INVENTION

1. Field of the Invention

The present invention is directed to a vane wheel, in particular an impeller wheel or turbine wheel, for a hydrodynamic coupling device comprising a shell which is rotatable about an axis of rotation during operation, and a plurality of vanes which are arranged at the shell successively in the circumferential direction, each of the vanes having at least one connection projection which is inserted into a connection recess provided in the shell.

2. Description of the Related Art

A vane wheel for a hydrodynamic coupling device, in particular in the form of an impeller wheel, is known from U.S. Pat. No. 3,550,234. In this impeller wheel, a plurality of vanes arranged successively in the circumferential direction and extending approximately radially are fixedly connected with an outer shell, designated hereinafter simply as "the shell". To this end, depressions are provided in the shell at two different radial areas opening in the direction perpendicular to the area of the shell in which they are arranged. In a corresponding manner, each of the vanes has projections which are insertable into these depressions by lever-like movements. Before the vanes are inserted into the shell, they are plated with copper in an electroplating process. An inner shell is optionally arranged at the inner side of the vanes after the vanes are arranged on the outer shell. The assembly including the shell, the vanes and, as the case may be, an inner shell is then placed in an oven and the copper plating is melted. The small intermediate space between the vanes and the shell and/or the inner shell is then filled with the melted copper by capillary action, so that the vanes are connected with the shell along their entire radial length.

A problem with this know connection of the vanes to the shell is that after the shell, which is generally made of a sheet metal part, has been shaped and undergone a cold hardening to reinforce the shell, some of the effects of cold hardening are lost when heating the assembly composed of the shell and vanes to secure the vanes to the shell. This reduces the stiffness and stability in the entire wheel. The known process has a high energy requirement because (1) the vanes must be coated with copper or some other soldering agent in an electroplating process and (2) it is necessary to heat the entire wheel. Furthermore, the heating step also significantly lengthens the production period for the entire wheel.

SUMMARY OF THE INVENTION

It is the object of the present invention to provide a vane wheel, in particular an impeller wheel or turbine wheel, for a hydrodynamic coupling device which can be produced economically and with a high degree of stability. Further, a process for the production of a vane wheel of this kind is provided.

According to a first embodiment of the present invention, the object is met by a vane wheel, in particular for an impeller wheel or turbine wheel, for a hydrodynamic coupling device, comprising a shell which is rotatable about an axis of rotation in operation and a plurality of vanes arranged at the shell successively in the circumferential direction, wherein each vane has at least one connection projection which is inserted into a connection recess provided in the shell.

In the vane wheel according to the present invention, it is further provided that the each vane has a fastening projection. The vanes are fixedly connected with the shell in the area of the fastening projection.

Since the vanes are fixedly connected with the shell in the area of their respective fastening projections, the vane wheel according to the present invention does not require the vanes to be soldered with the shell along their entire radial extension, for example, by coating with a solder.

The connection of the vanes with the shell at the fastening projections may be carried out, for example, by riveting and/or welding, preferably laser welding. Each vane comprises a planar sheet arranged in a vane plane. It is possible that the fastening projection is rotated with respect to the vane plane for contact at a surface region of the shell.

At least one rivet insertion opening may be provided at the fastening projection, wherein a rivet provided at the shell may be inserted into this at least one rivet insertion opening. Furthermore, the rivet insertion opening may be constructed so as to widen in one insertion direction. Due to the widening in the rivet insertion direction, a secure axial hold may be achieved between the shell and the corresponding vane after the deformation of the rivet projection even when the rivet projection has no pronounced rivet head area after shaping but is only expanded essentially radially (with respect to its longitudinal axis).

When the connection projections of the vanes are inserted into the connection recesses in the shell, small intermediate spaces are formed which would allow a movement play of the vanes in the circumferential direction. These small intermediate spaces would result in rattling noises during operation. To prevent rattling during operation, each vane is connected with the shell in the area of its fastening projection such that at least one connection projection is arranged in the associated connection recess accompanied by tensioning.

To ensure a high degree of stability in holding the vanes at the shell when no solder connection is provided over the entire radially extending area between the vanes and shell, the vanes may include a first connection projection in a radial outer area and a second connection projection in an area lying farther inside radially. The shell has a first connection recess and a second connection recess located farther inward radially corresponding respectively to the first and second connecting projections.

Another problem in the vane wheel known from the prior art which complicates production is that the connection recesses are open in a direction substantially normal to the surface of the shell in which they are arranged. Since the shell is curved and not planar, the production of these recesses must be carried out in a very costly process because depressions extending in this manner cannot be introduced simultaneously during the deep drawing process. Furthermore, an elaborate tool must be employed to generate these connection recesses. To avoid this problem, each vane may be guided, or is guided, into the respective associated first and second connection recess in the direction of the axis of rotation by its first and second connection projection. The axial insertion simplifies the connection process appreciably because the lever-like movement requiring a swiveling movement of the individual vanes need no longer be carried out as it was in the prior art. Also, the entire shell may be shaped in a single deep drawing process from a metal blank because no undercuts or the like are formed in the axial direction.

In known hydrodynamic coupling devices, there is a general tendency for the vanes to detach from the shell axially. To counter this tendency, it is further advantageous in the design of a wheel according to the present invention to provide a safety arrangement for holding the vanes at the shell in the radial outer area to prevent the vanes from moving in the axial direction. This is especially advantageous when the respective fastening projections are positioned in the radial inner area of the respective vanes.

The safety arrangement may comprise a retaining ring positioned so as to adjoin the first connection recesses in the axial direction or the first connection projections arranged therein. This retaining ring may be held at the shell by pretensioning and/or welding or the like.

According to another embodiment, the present invention is directed to a process for producing a vane wheel, in particular an impeller wheel or turbine wheel, of a hydrodynamic coupling device comprising the following steps:

(a) providing a plurality of vanes, each vane having at least one connection projection and a fastening projection;

(b) providing a shell having a connection recess corresponding with each of the at least one connection projection;

(c) inserting the vanes in the shell by inserting the connection projections into the corresponding connection recesses; and (d) fastening the vanes to the shell in the area of their fastening projections.

Step (a) of the process may comprise providing the vanes with a fastening projection which is rotated with respect to a vane plane. Alternatively, or in addition to the rotation of the fastening projection, step (a) may comprise providing the vanes with a radial outer first connection projection and a second connection projection located radially inward from the first connection projection and step (b) may comprise providing the shell with first connection recesses associated with the first connection projections and second connection recesses associated with the second connection projections.

It is further advantageous when step (b) comprises providing the shell with a fastening rivet projection for the fastening projection of each vane, wherein each of the fastening projections comprises an opening in which the fastening rivet projection may be fitted. After the fastening projection is fitted to the fastening rivet projection, the fastening projection of the vane can be fixed by deformation of the fastening rivet projection and/or when step (b) comprises providing the shell with a surface region at which the respective fastening projections of the vanes can be fastened by welding on, preferably by laser welding.

To simplify the production process as well as the assembly process as much as possible, it is suggested that step (b) comprises providing the shell with connection recesses such that in step (c) the vanes are inserted into the connection recesses with their connection projections by axial movement with respect to the shell. Step (b) may then also comprise providing the shell with connection recesses which are all open axially.

To improve the fixing of the individual vanes to the shell, the process according to step (c) further comprises a step (e) for positioning a safety arrangement at the shell for holding the vanes axially at the shell.

In this respect, step (e) may, for example, comprise arranging a retaining ring at the shell so as to axially adjoin the first connection recesses or the first connection projections arranged in the first connection recesses.

To prevent the occurrence of a slight circumferential movement play between the vanes and the shell, step (d) may comprise fastening the fastening projections to the shell in such a way that the connection projections are received in the associated connection recesses under tensioning.

Step (a) may further comprise, for example, stamping the vanes out of a metal blank and, where appropriate, shaping the stamped parts.

It may be further provided that step (b) comprises stamping the shell out of a metal blank and subsequently shaping the stamped out part to form the shell.

To simplify the production process, it is suggested that the shaping process is carried out at the same time as the forming of the connection recesses and/or the forming of fastening rivet projections at the shell.

The present invention is further directed to a hydrodynamic coupling device in which at least one of the turbine wheel and the impeller wheel comprises the vane wheel according to the present invention, wherein the vane wheel is preferably produced by a process according to the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements through the several views.

DETAILED DESCRIPTION OF THE PRESENTLY PREFERRED EMBODIMENTS

Figure 1:
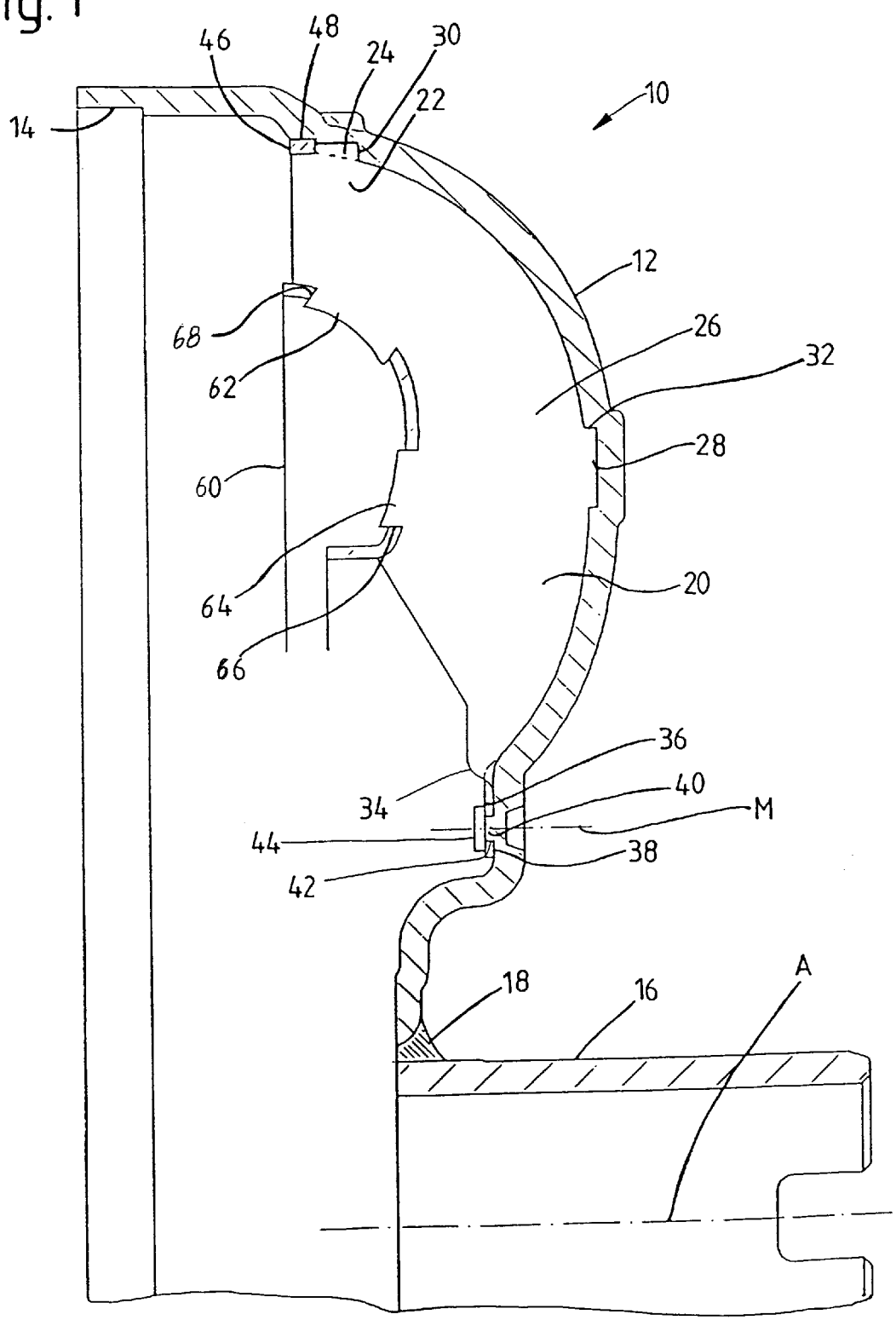
FIG. 1 is a partial longitudinal sectional view of an impeller wheel according to an embodiment of the present invention.

FIG. 1 shows a vane wheel 10 comprising an impeller wheel of a hydrodynamic torque converter. The invention will be described hereinafter with reference to the impeller wheel 10. It is noted at this point that, of course, the inventive vane wheel may also be used in a turbine wheel of a hydrodynamic torque converter or an impeller wheel or a turbine wheel of a hydrocoupling device.

The impeller wheel 10 has an outer shell 12 and is referred to hereinafter simply as "the shell 12". A radial outer area of the shell 12 comprises a connection area 14 for connecting the shell 12 with a housing cover of the torque converter. The shell 12 and housing cover together form a converter housing. A radial inner side of the shell 12 is fixedly connected with an impeller wheel hub 16 such as, for example, by welding 18 or the like. Alternatively, the shell 12 may be formed integral with the hub 16. The shell 12 is formed from a stamped out sheet metal blank in a deep drawing process which is described in more detail below.

A plurality of vanes 20 are successively arranged in the shell 12 along the circumferential direction and extend approximately radially. The vanes 20 are fixedly connected with the shell 12. A radial outer area 22 of each of the vanes 20 has a first connection projection 24 and a radial middle area 26, i.e., an area located radially inward from the radial outer area 22, of each of the vanes 20 has a second connection projection 28. First connection recesses 30 and second connection recesses 32 formed in the shell 12 respectively correspond to the first and second connection projections 24 and 28. The first and second connection recesses 30, 32 comprise depression-like recesses constructed such that the first and second connection projections 24 and 28, respectively, may be inserted into the shell 12 by moving the vanes 20 essentially parallel to an axis of rotation A, which also essentially forms an axis of symmetry of the impeller wheel 10. This means that both of the first connection recesses 30 and the second connection recesses 32 open in the axial direction, i.e., no undercut or the like is formed viewed in axial direction.

Figure 2:
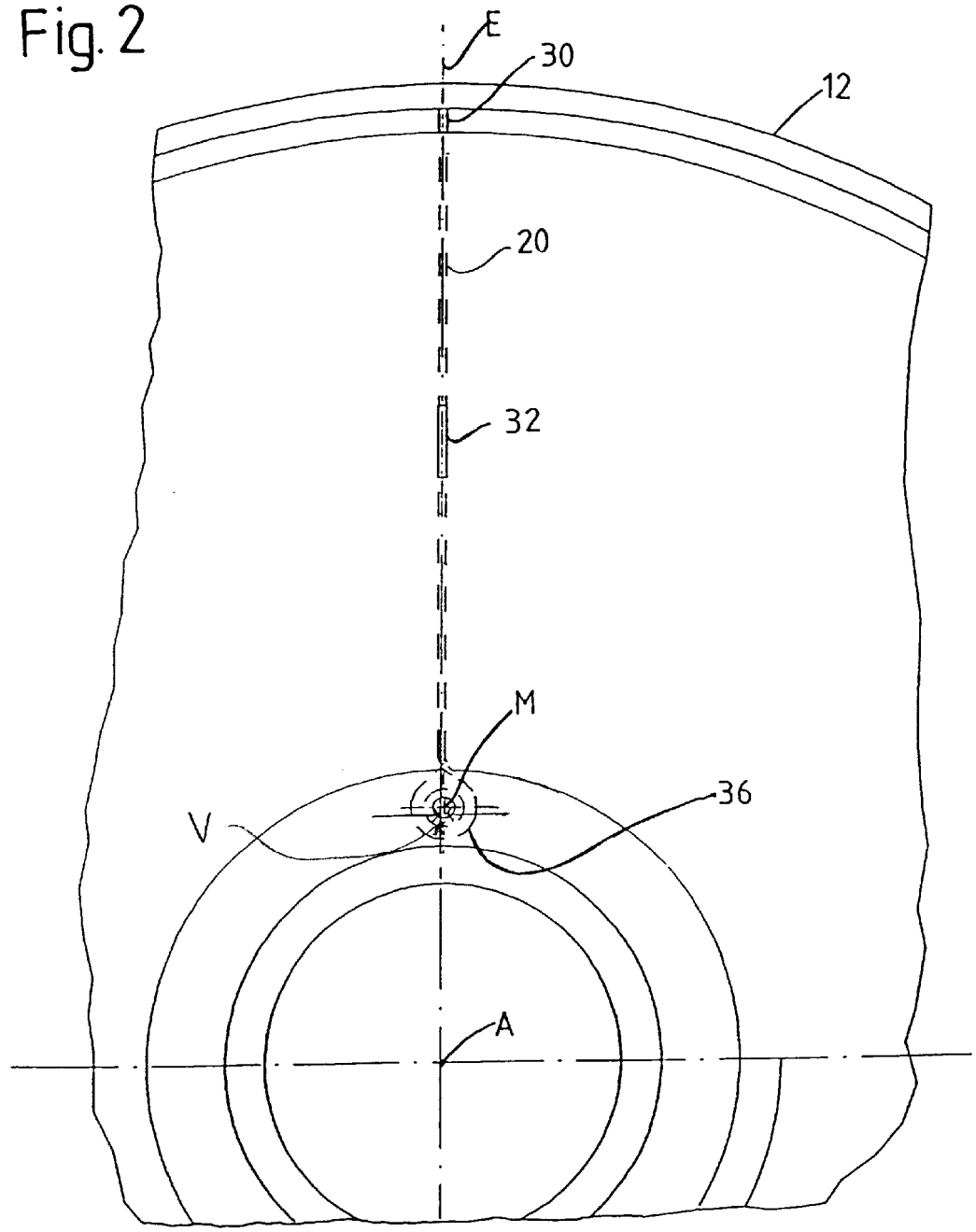
FIG. 2 is a partial axial view of the impeller wheel shown in FIG. 1.

Each of the vanes 20 has a fastening projection 36 arranged at a radial inner area 34 of the vane 20. The fastening projection 36 is formed by a tab which lengthens the vanes 20 toward the radial inside and lies outside of the fluid flow circuit. As shown in FIG. 2, the strengthening projection 36 formed by a tab is rotated out of a vane plane E which contains the axis of rotation A in the shown embodiment example and extending orthogonal to the plane on which FIG. 2 is drawn. In this way, the fastening projection 36 contacts a surface area at a surface region 38 of the shell 12 which is constructed so as to be essentially ring-shaped and extends substantially radially. A fastening rivet projection 40 is shaped in this surface region 38 during the shaping, i.e., deep drawing, of the shell 12 for every vane 20. The fastening rivet projection 40 penetrates an opening 42 in the fastening projection 36 and is then pressed flat to form a head 44, so that the fastening rivet projection 40 fastens the vane 20 to the shell 12 in a fixed manner by the head 44.

Figure 6:
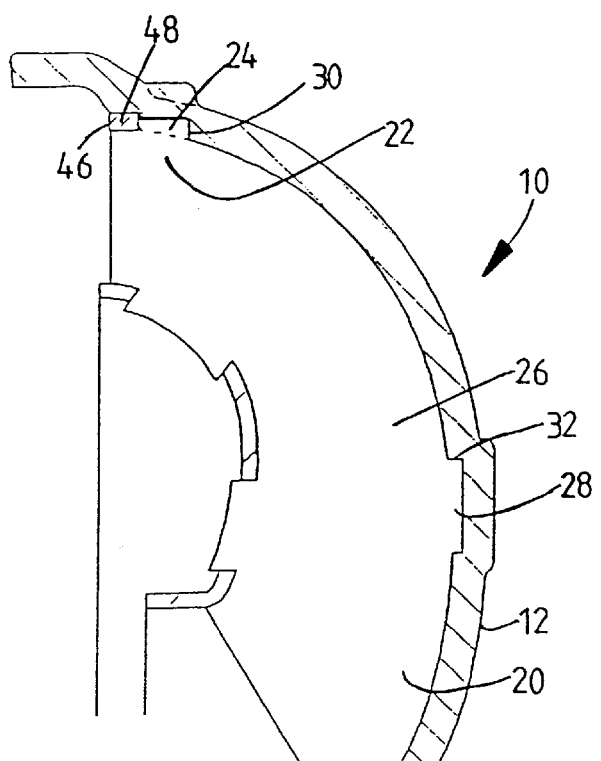
FIG. 6 is a partial longitudinal sectional view corresponding to FIG. 1 with an alternative type of fastening of the vanes.
Figure 7:
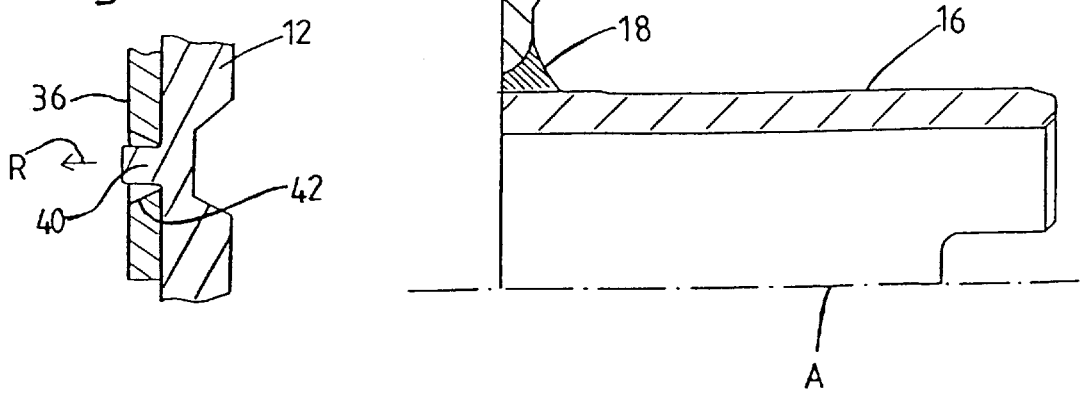
FIG. 7 is an enlarged detail of the embodiment form shown in FIG. 6.

An alternative type of fastening of the vanes 20 to the shell 12 via the fastening projection 40 is shown in FIGS. 6 and 7. In this embodiment, the rivet projections 40 are formed integral with the shell 12, for example, by embossing as in the embodiment of FIGS. 1 and 2. The rivet projections 40 enter the associated opening 42 in each instance when the vanes 20 are introduced at the shell 12. It will be seen from the enlarged detail in FIG. 7, that the openings 42 are formed such that they widen, e.g., slope in a funnel-shaped manner, in the direction R in which the fastening rivet projections 40 are inserted into them, i.e., in the direction away from the shell 12. In this embodiment, the length of the fastening rivet projections 40 is arranged such that when vanes 20 are introduced axially at the shell, the fastening rivet projection 40 which is not yet deformed projects slightly over the fastening projection 36 in the axial direction. The fastening rivet projection 40, or each fastening rivet projection 40, may then be deformed subsequently by a shaping tool, such as a mandrel or piercer, so that essentially no rivet head is formed in this case as will be seen, e.g., in the embodiment example of FIG. 1. Rather, the fastening rivet projection 40 is essentially expanded only radially within the opening and accordingly engages behind the widening of the opening 42 in the axial direction as shown in FIG. 6. When the axial length of the fastening rivet projection 40 which is not yet deformed is appreciably shorter, there is at the same time a very strong positive engagement axially between the vanes 20 and the shell 12. The substantial advantage of this embodiment is that substantially less material deformation is required in the area of the shell 12 when forming the fastening rivet projections 40 and in that the shorter length of the fastening rivet projections 40 facilitates axial introduction of the vanes 20 at the shell 12 with their fastening projections 36. Furthermore, after the deformation of the fastening rivet projections 40, the fastening rivet projections 40 project only a small amount, if at all, over the fastening projection 36 of the vanes 29 and are preferably contained within the opening 42, so that interference with the fluid flow by any overlapping structural component parts is prevented to a great extent.

It is noted that the opening 42 of the embodiment of FIGS. 6 and 7 may, of course, comprise a cylindrical opening instead of an expanding opening. The axial holding connection between the deformed fastening rivet projection 40 and the fastening projection 36 is achieved essentially through the radial expansion of the fastening rivet projection 40 of this kind in relation to its longitudinal direction and by the pressing of the material of the fastening rivet projection 40 against the essentially cylindrical inner circumferential surface of the opening 42. That is, when the opening 42 in the fastening projection 36 is cylindrical, the axial holding connection is essentially achieved by frictional engagement.

Otherwise, the embodiment form according to FIGS. 6 and 7 corresponds essentially to the embodiment forms shown in FIGS. 1 to 5, for which reference is had to the description relating to these Figures.

Figure 8:
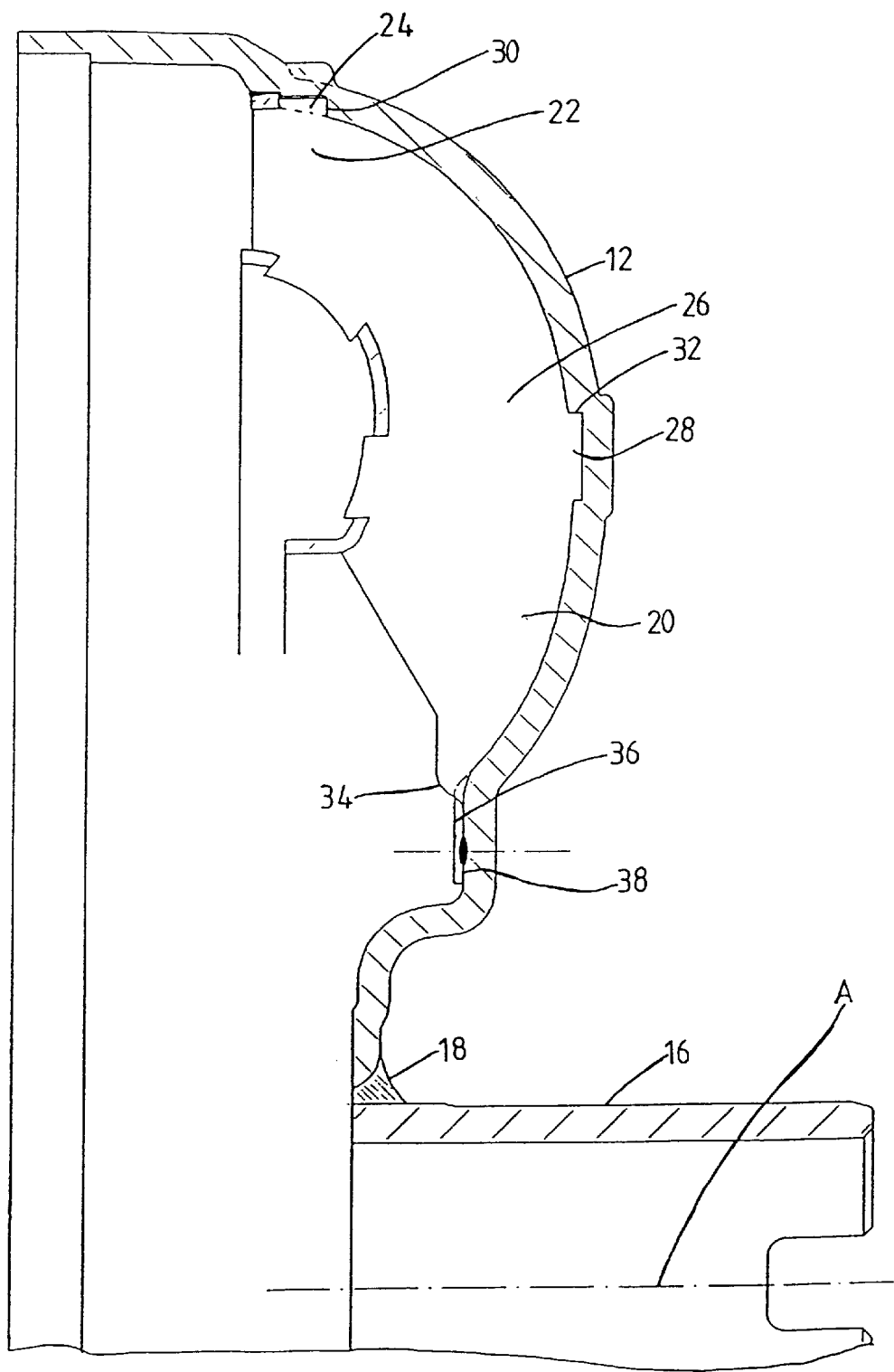
FIG. 8 is a partial longitudinal sectional view corresponding to FIG. 1 with a further alternative type of fastening of the vanes.

A further alternative type of fastening is shown in FIG. 8. As shown in FIG. 8, the fastening projection 36 of this vane 20 is not secured by a fastening rivet. Rather, the fastening projection is welded to the surface region 38 of the shell 12. The welding may be carried out, for example, by laser welding or the like. This type of fastening has the advantage that the shaping process for the shell 12 can be carried out more easily because no rivet projections or the like need to be formed at the shell 12 in this radial area. In principle, it is also possible to provide a combination of the fastening from FIG. 1 or FIG. 6 with the fastening from FIG. 8. In other respects, it is noted that the embodiment form according to FIG. 8 corresponds to the embodiment forms described with reference to FIGS. 1 to 5.

Further, it will be seen in FIG. 1 that the vanes 20 are secured axially to the shell 12 in the radial outer area 22 by a retaining ring 46. This retaining ring 46 is inserted into a cylindrical portion 48 of the shell 12 which directly axially adjoins the first connection recesses 30, i.e., it directly adjoins the axially open ends of the first connection recesses. In this way, the first connection projections 24 of the vanes 20 are axially fixed in the first connection recesses 30 so as axially hold the vanes 20 at the shell 12 in addition to the fastening area in the area of the fastening projections 36 which are positioned at the radial inward end of the vanes 20. As will also be seen particularly in FIG. 5, the retaining ring 46 is constructed as an open ring, i.e., the retaining ring 46 may be formed from a stamped sheet metal part or also from wire which is bent to form a ring with end regions 50, 52 located opposite from one another with a slight circumferential distance forming a gap 54 therebetween. When the retaining ring 46 is inserted into the cylindrical portion 48 of the shell 12, the gap 54 between the end regions 50, 52 is positioned such that it lies circumferentially between two first connection recesses 30 to prevent a connection projection from sliding out through the gap 54. The retaining ring 46 can be held at the shell 12 by radial spreading, i.e., pretensioning, which is ultimately achieved in that this retaining ring 46 is axially pressed into the cylindrical portion 48. Alternatively or in addition, the retaining ring 46 may be secured to the shell 12 by welding, for example, by laser welding. It is noted that the retaining ring 46 is preferably inserted in such a way that the first connection projections 24 are fixedly held, or clamped, between this retaining ring 46 and the axially closed ends of the first connection recesses 30.

Because of inevitable manufacturing tolerances, the fact that the individual vanes 20 are secured to the shell 12 only at determined points in the impeller wheel 10, according to the invention, shown in the drawing, results in the problem that the connection projections 24, 28 are received in the respective connection recesses 30, 32 with slight circumferential movement play. The slight circumferential movement play may lead to rattling noises during operation and/or to excessive wear in this region. To prevent the slight circumferential movement play in the vanes 20, the fastening projections 36 of the vanes 20 are fixed to the shell 12 such that the first and second connection projections 24, 28 are held in the corresponding first and second connection recesses 30, 32 with tension. As shown in FIG. 2, this tensioning may be achieved, for example, by arranging the center points M of the openings 42 of the fastening projections 36 offset in the circumferential direction by offset V in relation to a tension-free installation state given by the extension of the first and second connection recesses 30, 32. Accordingly, when the vanes 20 are constructed so as to extend in a straight line and the connection recesses 30, 32 are positioned in a corresponding manner so as to lie on a radial line, the fastening projection 36 is positioned so as to be offset in the circumferential direction by a corresponding offset V of the fastening rivet projections 40, so that the above-mentioned tensioning of the first and second connection projections 24, 28 occurs in the corresponding first and second connection recesses 30, 32.

The process of producing an impeller wheel 10, as was described above, is carried out in such a way that the shell 12 and the vanes 20 are first stamped out of a sheet metal part. The shell 12 is then shaped in a shaping process such as, for example, a deep drawing process so that the shell 12 is given the shape shown in FIGS. 1 and 5, respectively. Since, as was already stated, no undercuts are formed but, rather, all openings or contours are directed axially, the deep drawing process may be performed with an individual tool in a simple manner. At the vanes 20, as can be seen in FIGS. 1 and 2, the fastening projections 36 are rotated relative to the vane plane E such that the desired position is obtained with respect to the surface region 38 of the shell 12. Subsequently, the vanes 20 are advanced in the axial direction into the shell 12 with a tool and the first and second connection projections 24, 28 are respectively inserted axially into the first and second connection recesses 30, 32. At the same time, the fastening projection 36 is also moved with its opening 42 over the fastening rivet projection 40 due to the holding with lateral offset. Subsequently, the fastening rivet projection 40 is pressed flat with a tool. It is noted at this point once again that fastening of the fastening projection 36 to the shell 12 may be carried out alternatively or additionally by welding, for example, laser welding or spot welding. If this process is carried out, the vanes 20 are already fastened to the shell 12 because they are also held in the connection recesses 30, 32 with tension. However, to axially secure the vanes 20 to the shell 12, the retaining ring 46 is inserted into the cylindrical portion 48 on the radial outside, for example, by pressing the retaining ring 46 into the cylindrical portion 48, so that a positive or compulsory axial holding of the vanes 20 at the shell 12 is also achieved in that location. This retaining ring 46 may optionally be welded to the shell 12.

Before or after the vanes 20 are arranged at the shell 12, the vanes 20 may be coupled with an inner shell 60. This can be carried out, for example, in that the vanes 20 are inserted into associated connection openings 66, 68 of the inner shell 60 by a lever-like rotating movement. Before or after the fixed connection of the vanes 20 with the shell 12, these connection projections 62, 64 cooperating with the inner shell 60 may be fixedly connected with the inner shell 60 by rolling, i.e., by bending the ends of the connection projections 62, 64 in the circumferential direction. In this way, the use of solder for producing a fixed coupling can also be dispensed with in this connection area.

Figure 3:
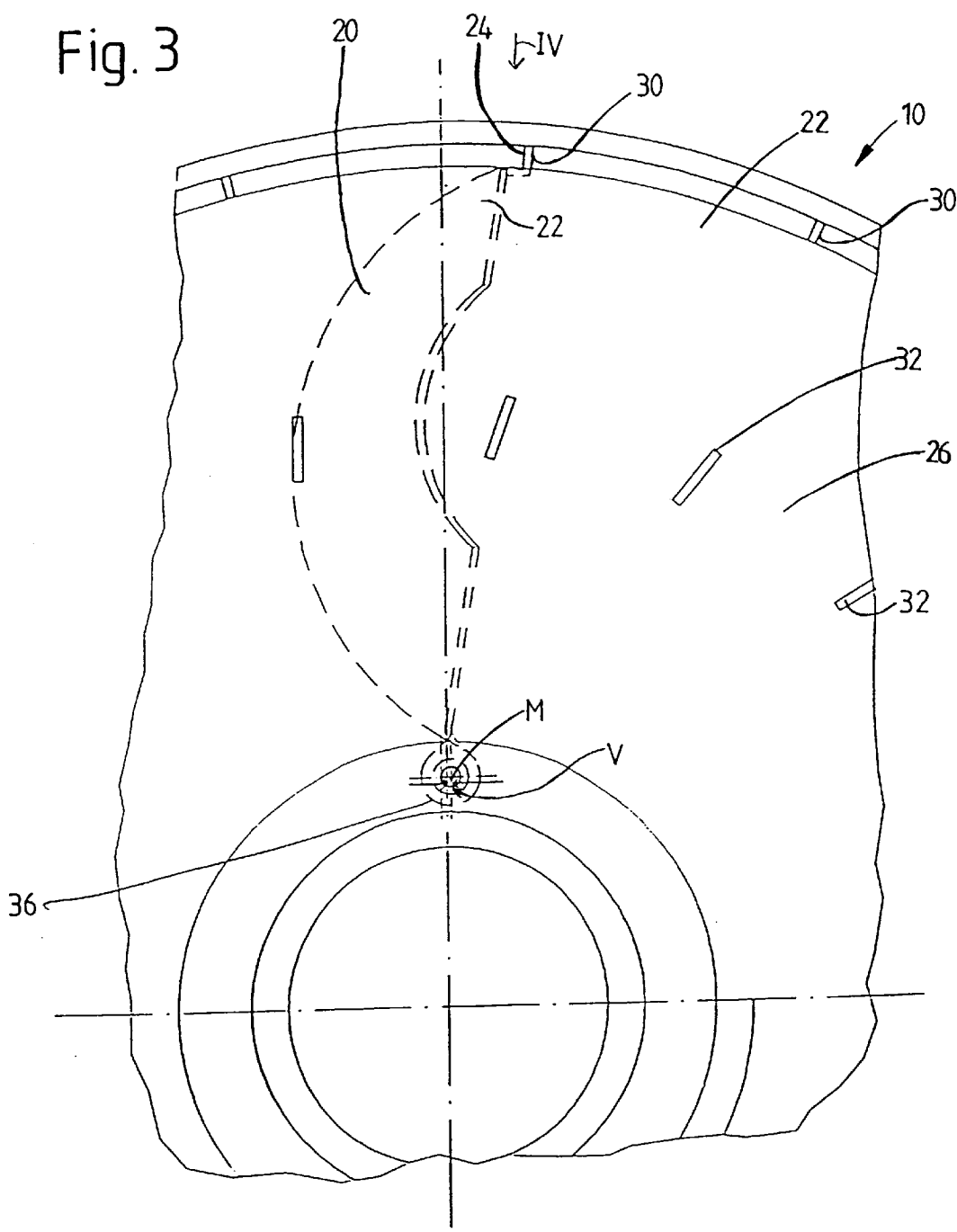
FIG. 3 is a view corresponding to the view of FIG. 2, showing an impeller wheel according to the present invention with a vane having a modified vane shape.
Figure 4:
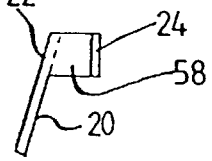
FIG. 4 is a radial view of the vane shown in FIG. 3 along the direction IV shown in FIG. 3.
Figure 5:
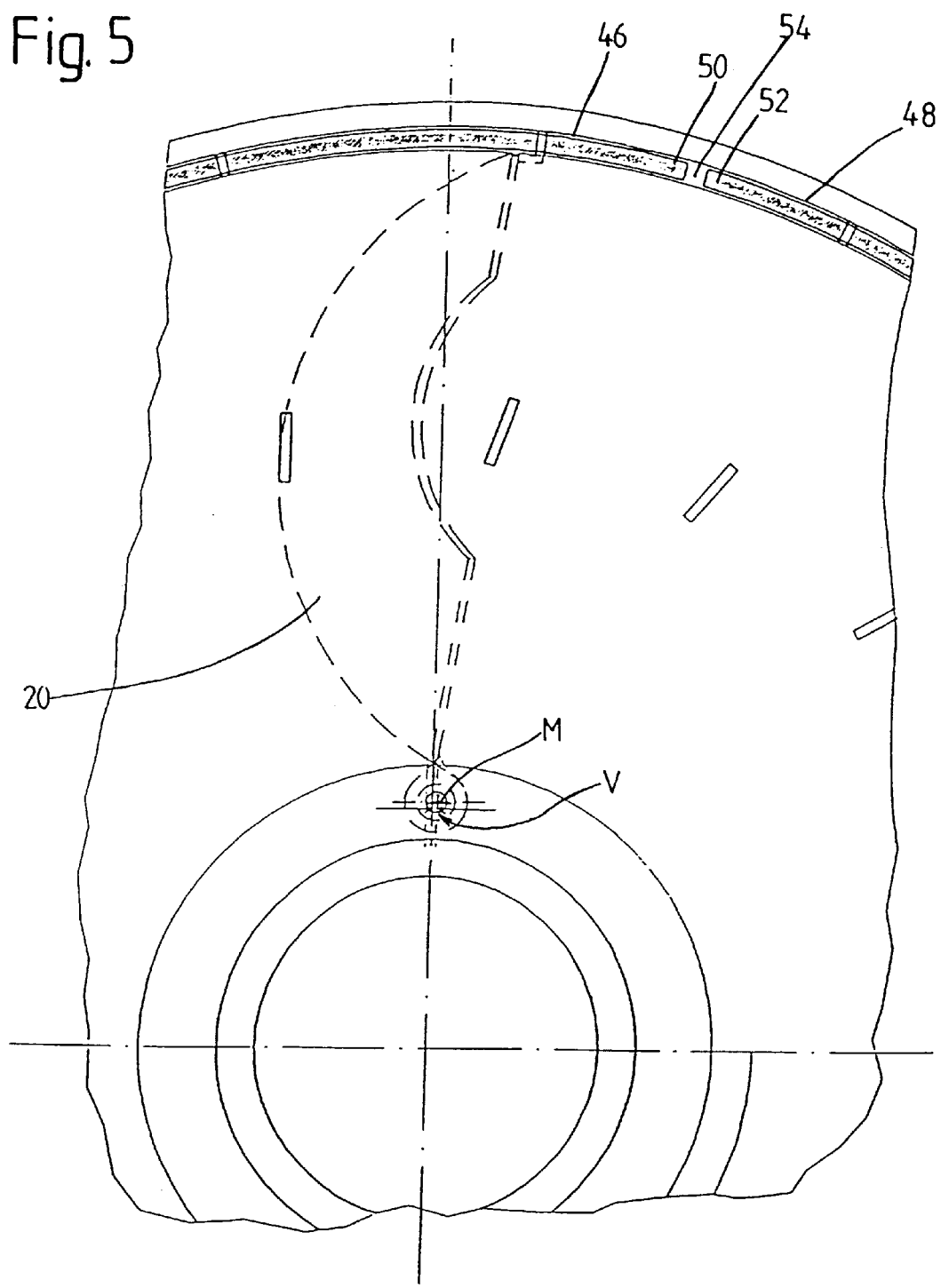
FIG. 5 is a view corresponding to FIG. 3 with a retaining ring inserted in the impeller wheel shell.

FIGS. 3 to 5 show a modification of the impeller wheel 10 described above. In FIGS. 3–5, the vanes 20 are constructed such that they do not extend exactly in the radial direction. Rather, the vanes 20 are slightly curved in the circumferential direction and are inclined slightly in the axial direction. In principle, however, the construction corresponds to that described above. That is, the first connection recesses 30 are again provided at a radial outer area 22 at the shell 12 and the second connection recesses 32 are formed in a radial central area 26. In this embodiment, the connection recesses 32 now have a configuration which deviates from the exact radial direction and are adapted to the configuration of the shells 20. However, since the vanes 20 are now curved, an axial insertion into the first connection recesses 30 is not possible in the area of the first connection projections 24 located radially outside. For this purpose, as can be seen in FIG. 4, the vanes 20 have a laterally bent tab 58 in their radial outer area 22, whose free end located at a distance from the vane body can now be bent irrespective of the vane configuration or extension to form the axially extending connection projection 24 on the radial outside. To prevent a disturbance of the fluid flow directed along the inner surface of the shell 12 by this tab 58 which is bent in the radial outer area 22 of the vane 20, depressions are provided in this location preferably by pressing or during the deep drawing process at the inner surface of the shell 12. The depressions adjoin the first connection recesses 30 in the circumferential direction and the tabs 58 then being received therein, so that an essentially plane surface configuration is again provided at the shell 12.

With respect to the provision of an offset V for preventing rattling noises, it is again provided in the embodiment form according to FIGS. 3 to 5 that the fastening projection 36 is fastened to the associated fastening rivet projection 40 with a lateral offset V in relation to a tension-free installation position or is welded in a corresponding position.

By means of the procedure according to the invention, a vane wheel, e.g., an impeller wheel or a turbine wheel for a hydrodynamic coupling device, may be produced in a simple manner without requiring any plating or soldering processes. This simplifies the production process considerably and leads to a shell which is extremely stiff and stable in spite of the absence of long solder connections, because the shaping provided by the deep drawing process and the offsetting that, in doing so, is generated in the metal lattice structure are fully retained. Also, providing connection recesses in the shell, i.e., in the outer shell, which allow an axial insertion of the vanes facilitates the production process for producing the shell itself as well as the process of joining together the shell and the vanes. It is noted that this idea may also be used advantageously in connection with turbine wheels in which these connection recesses are generally formed as continuous slits. In impeller wheels in which a tight closure must be present relative to the outside, the shown construction with depression-like recess areas for inserting the connection projections is advantageous.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A vane wheel for a hydrodynamic coupling device, comprising a shell rotatable about an axis of rotation and a plurality of vanes arranged in circumferential succession in the shell, each of said plural vanes comprising a first connection projection and a fastening projection, wherein said first connection projection is inserted into a first connection recess in said shell and said fastening projection is arranged on a surface region in said shell, wherein each of said plural vanes is fixedly connected to said shell via said fastening projection, wherein said fastening projection of said each of said plural vanes is fixed to said shell via a connection comprising one of riveting and welding, and wherein said fastening projection comprises a rivet insertion opening and said shell comprises a rivet projection, wherein said each of said plural vanes is arranged on said shell such that said rivet projection is inserted into said rivet insertion opening.

2. The vane wheel of claim 1, wherein said rivet insertion opening widens in an inserting direction.

3. The vane wheel according to claim 1, wherein said first connection projection is arranged at a radial outer area of said each of said plural vanes and said each of said plural vanes comprises a second connection projection arranged in an area radially inward from said first connection projection, said shell comprising a second connection recess corresponding to said second connection projection.

4. The vane wheel of claim 3, wherein said first and second connection projections of each of said plural vanes are guided into the respective corresponding first and second connection recesses in the direction of the axis of rotation.

5. The vane wheel of claim 3, further comprising a safety arrangement operatively arranged for holding the radial outer area of said plural vanes and preventing axial movement of the radial outer area of said plural vanes.

6. A vane wheel for a hydrodynamic coupling device, comprising a shell rotatable about an axis of rotation and a plurality of vanes arranged in circumferential succession in the shell, each of said plural vanes comprising a first connection projection and a fastening projection, wherein said first connection projection is inserted into a first connection recess in said shell and said fastening projection is arranged on a surface region in said shell, wherein each of said plural vanes is fixedly connected to said shell via said fastening projection, and wherein said each of said plural vanes is arranged in a vane plane and wherein said fastening projection is rotated with respect to said vane plane for contacting said surface region in said shell such that said first connection projection is arranged in the first connection recess under pretensioning.

7. A vane wheel for a hydrodynamic coupling device, comprising a shell rotatable about an axis of rotation and a plurality of vanes arranged in circumferential succession in the shell, each of said plural vanes comprising a first connection projection and a fastening projection, wherein said first connection projection is inserted into a first connection recess in said shell and said fastening projection is arranged on a surface region in said shell, wherein each of said plural vanes is fixedly connected to said shell via said fastening projection, and wherein each of said plural vanes is connected with said shell via said fastening projection such that said first connection projection is arranged in the first connection recess under a tensioning.

8. A vane wheel for a hydrodynamic coupling device, comprising a shell rotatable about an axis of rotation and a plurality of vanes arranged in circumferential succession in the shell, each of said plural vanes comprising a first connection projection and a fastening projection, wherein said first connection projection is inserted into a first connection recess in said shell and said fastening projection is arranged on a surface region in said shell, wherein each of said plural vanes is fixedly connected to said shell via said fastening projection, wherein said first connection projection is arranged at a radial outer area of said each of said plural vanes and said each of said plural vanes comprises a second connection projection arranged in an area radially inward from said first connection projection, said shell comprising a second connection recess corresponding to said second connection projection; and a safety arrangement operatively arranged for holding the radial outer area of said plural vanes and preventing axial movement of the radial outer area of said plural vanes, wherein said safety arrangement comprises a retaining ring operatively positioned so as to adjoin said first connection recesses in the axial direction.

9. The vane wheel of claim 8, wherein said safety arrangement comprises a retaining ring operatively positioned so as to adjoin said first connection projection arranged in said first connection recess.

10. The vane wheel of claim 8, wherein said retaining ring is held at said shell via a connection comprising one of pretensioning and welding.

11. A process for producing a vane wheel of a hydrodynamic coupling device, comprising the steps of:

(a) providing a plurality of vanes, each of the plural vanes having at least one connection projection and a fastening projection, and rotating the fastening projection of each of the plural planes with respect to a vane plane to pretension the at least one pretension connection projection in the connection recess;

(b) providing a shell having a connection recess corresponding with each of the at least one connection projection;

(c) inserting the vanes in the shell by inserting the connection projections into the corresponding connection recesses; and (d) fastening the vanes to the shell in the area of their fastening projections.

12. The process of claim 11, wherein said step (a) further comprises providing each of the plural vanes with a radial outer first connection projection and a second connection projection radially inward from said first connection projection, and wherein said step (b) comprises providing said shell with first connection recesses corresponding with each of the first connection projections and a second connection recesses corresponding with each of the second connection projections.

13. The process of claim 11, wherein said step (b) comprises providing the shell with surface regions, arranging the fastening projections of the plural vanes at the surface regions, and fixing the fastening projections to the shell via welding.

14. The process of claim 11, wherein said step (b) comprises providing the shell with first and second connection recesses and said step (c) comprises inserting first and second connection projections of the vanes into the first and second connection recesses by axial movement with respect to the shell.

15. The process of claim 14, wherein said step (b) comprises providing the shell with connection recesses which are all open axially.

16. The process of claim 11, wherein said step (c) further comprises a step of:
   (e) positioning a safety arrangement at the shell for axially holding the vanes at the shell.

17. The process of claim 11, wherein said step (a) comprises stamping the vanes out of a metal blank and shaping the stamped parts as appropriate.

18. The process of claim 11, wherein said step (b) comprises stamping the shell out of a metal blank and subsequently shaping the stamped out part to form the shell.

19. The process of claim 11, wherein the vane wheel being produced by the process is one of an impeller wheel and a turbine wheel of a hydrodynamic coupling device.

20. A process for producing a vane wheel of a hydrodynamic coupling device, comprising the steps of:
   (a) providing a plurality of vanes, each of the plural vanes having at least one connection projection and a fastening projection;
   (b) providing a shell having a connection recess corresponding with each of the at least one connection projection by providing the shell with a fastening rivet projection for each of the plural vanes, inserting each of the plural vanes onto the shell such that the fastening rivet projections are inserted into openings in the fastening projections of the plural vanes, and fixing the fastening projections onto the shell by deforming the fastening rivet projection;
   (c) inserting the vanes in the shell by inserting the connection projections into the corresponding connection recesses; and
   (d) fastening the vanes to the shell in the area of their fastening projections.

21. A process for producing a vane wheel of a hydrodynamic coupling device, comprising the steps of:
   (a) providing a plurality of vanes, each of the plural vanes having at least one connection projection and a fastening projection;
   (b) providing a shell having a connection recess corresponding with each of the at least one connection projection;
   (c) inserting the vanes in the shell by inserting the connection projections into the corresponding connection recesses;
   (d) fastening the vanes to the shell in the area of their fastening projections; and
   (e) positioning a safety arrangement at the shell for axially holding the vanes at the shell, wherein said step (a) further comprises providing each of the plural vanes with a radial outer first connection projection and a second connection projection radially inward from said first connection projection, and wherein said step (b) comprises providing said shell with first connection recesses corresponding with each of the first connection projections and a second connection recesses corresponding with each of the second connection projections and said step (e) comprises arranging a retaining ring at the shell so as to axially adjoin one of the first connection recesses and the first connection projections of the plural vanes arranged in the shell.

22. The process of claim 21, wherein said step (b) comprises stamping the shell out of a metal blank and subsequently shaping the stamped out part to form the shell and the step of shaping the shell is performed the same time as the forming of the first and second connection recesses and the forming of fastening rivet projections at the shell.

23. A process for producing a vane wheel of a hydrodynamic coupling device, comprising the steps of:
   (a) providing a plurality of vanes, each of the plural vanes having at least one connection projection and a fastening projection;
   (b) providing a shell having a connection recess corresponding with each of the at least one connection projection;
   (c) inserting the vanes in the shell by inserting the connection projections into the corresponding connection recesses;
   (d) fastening the vanes to the shell in the area of their fastening projections by fastening the fastening projections to the shell such that the connection projections are received in the corresponding connection recesses under tensioning.

* * * * *